3,651,095
PROCESS FOR THE PURIFICATION OF TRIMELLITIC ANHYDRIDE
Gerhard Jung, Cologne-Weidenpesch, and Gerhard Klotgen, Essen, Germany, assignors to Chemiebau Dr. A. Zieren G.m.b.H. & Co. KG, Cologne-Mungersdorf, Germany
No Drawing. Filed Oct. 11, 1968, Ser. No. 766,970
Claims priority, application Germany, Oct. 24, 1967, P 16 43 816.7
Int. Cl. C07c 63/02, 63/32
U.S. Cl. 260—346.4                    13 Claims

ABSTRACT OF THE DISCLOSURE

A process for the continuous purification of crude trimellitic anhydride obtained by an oxidation process, such as the nitric acid oxidation of 1,2,4-trialkyl benzene and subsequent anhydride formation by distillation at elevated temperatures under a vacuum, wherein molten, crude trimellitic anhydride is distributed in a thin film and subjected to distillation conditions for a period of less than 120 seconds under a pressure of about 3 to 30 torr (millimeters of mercury), and at a temperature of between about 205 and 270° C.

BACKGROUND OF THE INVENTION

The field of the invention is polycarboxylic acid anhydrides and methods of treating.

The state of the prior art is set forth in U.S. Pats. 2,887,497 of Hodes, which issued May 19, 1959; 2,971,011 of Liao et al., which issued Feb. 7, 1961; 2,998,431 of McKinnis, which issued Aug. 29, 1961; and 3,206,475 of Malo, which issued Sept. 14, 1965. The disclosures of these patents are incorporated herein.

Trimellitic anhydride has gained increasing importance as an intermediate in raw materials for varnishes, plasticizers and synthetic resins. Trimellitic acid is prepared by pressure oxidation of pseudocume at elevated temperatures. This oxidation is carried out with nitric acid or with atmospheric oxygen in an acetic acid solution in the presence of a suitable oxidation catalyst. The acid is then converted into trimellitic anhydride by a number of different processes, such as by treatment with acetic anhydride at elevated temperatures. The crude trimellitic anhydride produced from trimellitic acid still contains impurities, such as nitromethylphthalic anhydride which is formed during the nitric acid oxidation and causes an undesirable yellow coloration of the product.

According to the patent of McKinnis pure trimellitic anhydride is produced by treating crude trimellitic acid with vanadium pentoxide at temperatures between 300 and 400° C. for from 2 to 60 minutes. The trimellitic anhydride produced in this process is distilled in Example I at 265° C. under a pressure of 7 torr. Because of the relatively high treatment and distillation temperatures, the anhydride decomposes extensively and there is a poor yield.

In order to avoid discoloration the patent of Liao et al. teaches the distillation of trimellitic anhydride above 250° C. under a pressure of 10–60 torr (1 torr equals 1 mm. Hg). Under the conditions of Liao et al. the rate of decomposition of trimellitic anhydride exceeds the acceptable limits for carrying out the process.

From the disclosure of Hodes, it is known to dehydrate trimellitic acid in the presence of acetic anhydride at a pressure of between 0.1 and 10 torr, and a temperature of between about 180–220° C. When this process is employed to prepare trimellitic anhydride from crude trimellitic acid on a laboratory scale, the yield is about 88%. With industrial scale amounts of the starting material, the yield is further reduced. This reduction is particularly apparent at pressures above 5 torr as a result of the higher thermal load on the product.

The patent of Malo (column 3, line 50 to column 4, line 36) discloses the purification of crude trimellitic anhydride on a laboratory scale by discontinuous fractionation at a still pot temperature and pressure of 237–250° C. and about 6 torr, respectively. With this process, only 46% of the raw material employed is fractionated up to 250° C. and the remainder is fractionated in the presence of superheated steam with the pot temperature increased to 316° C. The total yield of pure trimellitic anhydride for this process is only slightly above 80%.

SUMMARY OF THE INVENTION

It is an object of the present invention to provide a process for the continuous purification of crude trimellitic anhydride on an industrial scale under nonrigorous conditions so that no additional losses are incurred by the purification step and a maximum yield of trimellitic anhydride is obtained.

The limitations of the prior art are avoided by exposing molten crude trimellitic anhydride to distillation conditions in the form of a thin film at a pressure of about 3 to 30 torr, and at a temperature of between 205 and 270° C., and a contact time of less than 2 minutes. The molten trimellitic anhydride is allowed to flow through a vaporization tube of, for example, cylindrical shape under ambient vaporization conditions and in a layer thickness of preferably less than 1.5 mm. In carrying out this process, the trimellitic anhydride is evaporated and then condensed in pure liquid form in a condenser connected thereafter. The film of trimellitic anhyldride is agitated by a rotor while flowing down the inner wall of the tube. This ensures a rapid heat exchange with the externally heated tube wall and satisfactory mass transfer with the gaseous phase. The contact time under distillation conditions, which is also a factor in determining the rate of decomposition, is accordingly shortened to less than 2 minutes. As a result, industrial scale amounts on the order of 1 metric ton per hour and more can be purified in a distillation unit without impairment of the yield.

As compared with the prior art purification methods, an important advantage exhibited by the present invention is that the trimellitic anhydride is distilled at higher temperatures and a lesser vacuum is required than heretofore, without decreasing the yield in anhydride due to decomposition. According to the present invention, it has been found that the decomposition due to a large thermal load is not significant in cases of short contact time so that it is possible to conduct industrial scale distillation at a lower expense for the maintenance of a vacuum.

DESCRIPTION OF THE PREFERRED EMBODIMENTS

In accordance with the preferred embodiments of the invention, the molten crude trimellitic anhydride is distilled in the form of a thin layer having a thickness of about 0.5 mm. to 3.5 mm., and preferably a thickness of 0.8 mm. to 1.5 mm., and under a pressure of about 5 to 14 torr and a temperature of between about 220 and 250° C. Distillation under a pressure of 6 to 10 torr and a temperature of between 226 and 240° C. proved especially advantageous and produce a particularly good pure product. Suitably, the contact time under distillation conditions for the trimellitic anhydride is maintained, in correspondence to the length of the product film, between 10 and 60 seconds, and in particular at about 20 seconds. It is recommended that the contact time be limited in order to keep the decomposition as low as possible.

For high volume outputs of the product, it is possible to use two or more distillation units in series, with a corresponding limited length of the film in each unit. On the other hand, by the present invention, it is possible to remove at least 50% of the impurities in a single distillation unit.

According to the present invention, 3 to 10% by weight, preferably 3 to 6% by weight, of the crude trimellitic anhydride is continuously withdrawn from the distillation zone as the distillation residue.

The trimellitic anhydride obtained by oxidation with nitric acid does not contain any substantial interfering, volatile impurities. However, when a single step distillation is conducted according to the invention, the production of pure trimellitic anhydride is accompanied by a minor amount of by-products. The present invention therefore contemplates that the purity of the trimellitic anhydride can be further improved by rectification of the evaporated trimellitic anhydride. For rectification purposes, it is possible to employ vacuum rectification columns in the above-mentioned pressure ranges. For example, thin film or rectification columns having rotating devices are particularly useful. A conventional packed or plate column is useful only to a limited extent in the pressure range of the present invention.

Up to now it was general opinion that nitro-carboxylic acid anhydride contained in raw trimellitic anhydride from the oxidation process by nitric acid cannot be separated by distillation (cf. U.S. Pat. 2,998,431, col. 1, lines 23 to 30). The main nitro-compound accompanying the trimellitic anhydride in the distillation step is 3 nitrophthalic anhydride the volatility of which is approximately equal to or only a little greater than that of trimellitic anhydride so that there seemed to be no possibility to remove this nitro-compound by distillation.

Now we have found that 3 nitro-phthalic anhydride which is the main colorant of the distillate is not formed in the oxidation step but in the usual distillation step according to the reaction

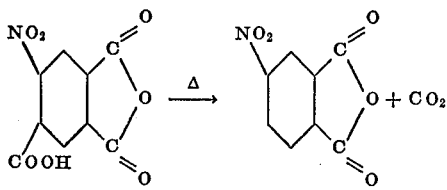

and that this formation of 3-nitro-phthalic anhydride surprisingly can be repressed with the distillation conditions according to the present invention. With these regulated conditions nearly no decarboxylation of the nitro-trimellitic anhydride formed in the oxidation step occurs so that this compound the volatility of which seems to be lower than that of trimellitic anhydride remains in the residue from distillation and the distillate is substantially free of nitro-compounds and shows white color. Thus, our invention is based on the new recognition that contrary to the teaching of U.S. Pat. 2,998,431 the coloring nitro-compound can be removed if one avoids formation of 3 nitro-phthalic anhydride.

By rectifying trimellitic anhydride which is continuously vaporized from a thin film, it is possible to produce, from a 94% crude product, a trimellitic anhydride having a purity of more than 99%.

Without further elaboration, it is believed that one skilled in the art can, using the preceding description, utilize the present invention to its fullest extent. The following preferred specific embodiments are, therefore, to be construed as merely illustrative and not limitative of the remainder of the specification and claims in any way whatsoever.

EXAMPLE 1

The distillation apparatus is a vertical and cylindrical tube having heating means on the outside thereof. The crude, 94% pure trimellitic anhydride, is delivered in an amount of 0.3 metric ton per hour at the upper end of the tube and is distributed along the inner circumference thereof in the form of a film having a thickness of 1.0 mm. A vacuum of 8 to 10 torr is maintained in the vaporization tube and the temperature of the tube wall is about 240° C. The evaporating film of trimellitic anhydride flowing down the inner wall of the tube is maintained by means of a rotor. After about 20 seconds, the film reaches the bottom outlet of the tube, and from there it is continuously withdrawn at the rate of 15 kg./h. of residue. The trimellitic anhydride evaporated in the distillation tube is condensed in a condenser connected thereafter and collected in the form of a liquid. The condenser is maintained at a temperature of about 170° C. In this manner, 0.285 metric ton per hour of trimellitic anhydride are obtained. The purity of the trimellitic anhydride is 97.0%. The acid number of the distilled product is 872 (theoretical acid number: 876).

EXAMPLE 2

In the same distillation tube as used in Example 1, 0.4 metric tons per hour of liquid crude trimellitic anhydride is introduced. The distillation is conducted under a pressure of 5 torr at a temperature of 220° C. After a contact time of about 18 seconds, approximately 94% of the crude product has evaporated. 24 kg./h. of residue are continuously withdrawn from the evaporator. 376 kg./h. of trimellitic anhydride are condensed in the condenser. The trimellitic anhydride in the condenser has a purity of 97.0% and an acid number of 872. The distillate residues are analyzed and the results indicate that in the process of this invention no losses occur due to the decomposition of trimellitic anhydride. The distillation tubes used in accordance with the process of invention are known in the art and are described p.e. by A. R. Gudheim in Rubber Age, June 1960, and by J. T. Ryley in Industrial Chemist, June 1962.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:
1. A process for the continuous purification of crude trimellitic anhydride obtained by oxidation of 1,2,4-trialkyl benzene with nitric acid to produce trimellitic acid followed by dehydration of the acid to the corresponding anhydride, said process comprising: directly distributing said crude trimellitic anhydride as a thin molten film having a thickness of 0.5–3.5 mm. on a downwardly extending heat exchange surface, and distilling resultant downwardly flowing film under a pressure of about 3–30 mm. Hg at a temperature of between about 205 and 270° C. and for a distillation contact time of less than 120 seconds.

2. The process of claim 1, wherein the distillation pressure is about 5 to 14 mm. Hg and the temperature is between about 220 and 250° C.

3. The process of claim 1, wherein the distillation pressure is about 6–10 mm. Hg and the temperature is between about 226 and 240° C.

4. The process of claim 1, wherein the distillation contact time is maintained between about 10 and 60 seconds.

5. The process of claim 4, wherein the distillation contact time is maintained at about 20 seconds.

6. The process of claim 1, wherein about 3 to 10% by weight of the crude trimellitic anhydride is withdrawn continuously as a distillation residue.

7. The process of claim 6, wherein about 3 to 6% by weight of the crude trimellitic anhydride is withdrawn continuously as a distillation residue.

8. The process of claim 1, wherein the thin film has a thickness of less than 1.5 mm.

9. The process of claim 2, wherein the thin film has a thickness of 0.8–1.5.

10. The process of claim 3, wherein the thin film has a thickness of 0.8–1.5.

11. The process of claim 9, wherein about 3 to 10% by weight of the crude trimellitic anhydride is withdrawn continuously as a distillation residue.

12. The process of claim 11, wherein about 3 to 6% by weight of the crude trimellitic anhydride is withdrawn continuously as a distillation residue.

13. The process of claim 1, further comprising agitating said downwardly flowing film during said distillation step.

References Cited
UNITED STATES PATENTS

| | | | |
|---|---|---|---|
| 3,206,475 | 9/1965 | Malo | 260—346.3 |
| 3,420,750 | 1/1969 | Schaeffer et al. | 203—89 |

OTHER REFERENCES

Weissberger, Arnold: Technique of Organic Chemistry, vol. IV, Distillation, New York, Interscience Publishers Inc. (1951), pp. 505–506.

ALEX MAZEL, Primary Examiner

B. I. DENTZ, Assistant Examiner

U.S. Cl. X.R.

203—89; 260—346.3